(12) United States Patent
Mulligan et al.

(10) Patent No.: US 6,517,255 B2
(45) Date of Patent: Feb. 11, 2003

(54) PLASTIC OPTICAL FIBER CONNECTOR

(76) Inventors: Paul M. Mulligan, 9626 Lisbon Rd., Yorkville, IL (US) 60560; Carl W. Lindenmeyer, 384 D. Brittany Ct., Geneva, IL (US) 60134

( * ) Notice: Subject to any disclaimer, the term of this patent is extended or adjusted under 35 U.S.C. 154(b) by 92 days.

(21) Appl. No.: 09/794,993

(22) Filed: Feb. 28, 2001

(65) Prior Publication Data

US 2003/0012519 A1 Jan. 16, 2003

Related U.S. Application Data

(63) Continuation-in-part of application No. 09/677,186, filed on Dec. 20, 2000, now abandoned.

(51) Int. Cl.$^7$ .................................................. G02B 6/36
(52) U.S. Cl. .......................... 385/78; 385/81; 385/76
(58) Field of Search ............................ 385/76, 78, 81, 385/86, 87

(56) References Cited

U.S. PATENT DOCUMENTS

| | | | | |
|---|---|---|---|---|
| 4,684,205 A | * | 8/1987 | Margolin et al. | 385/68 |
| 4,711,517 A | * | 12/1987 | Fentress et al. | 385/85 |
| 5,212,752 A | * | 5/1993 | Stephenson et al. | 385/78 |
| 5,481,634 A | * | 1/1996 | Anderson et al. | 385/76 |
| 5,502,784 A | * | 3/1996 | Rondeau | 385/66 |
| 5,761,360 A | * | 6/1998 | Grois et al. | 385/81 |
| 6,022,150 A | * | 2/2000 | Erdman et al. | 385/81 |
| 6,030,129 A | * | 2/2000 | Rosson | 385/81 |
| 6,203,210 B1 | * | 3/2001 | Mikula et al. | 385/78 |
| 6,206,581 B1 | * | 3/2001 | Driscoll et al. | 385/78 |
| 6,238,103 B1 | * | 5/2001 | Ezawa | 385/81 |

* cited by examiner

Primary Examiner—Akm E. Ullah
Assistant Examiner—Jennifer Doan
(74) Attorney, Agent, or Firm—Frank L. Hart

(57) ABSTRACT

A connector is provided which has a ferrule forcibly, intimately connected to a plastic optical fiber by forcibly deforming the ferrule into intimate contact with the plastic optical fiber over a preselected length. The fiber and ferrule are free of adhesive, have a machined planar end oriented 90 degrees relative to the axis of the ferrule and plastic optical fiber and have a preselected, carefully controlled length.

9 Claims, 2 Drawing Sheets

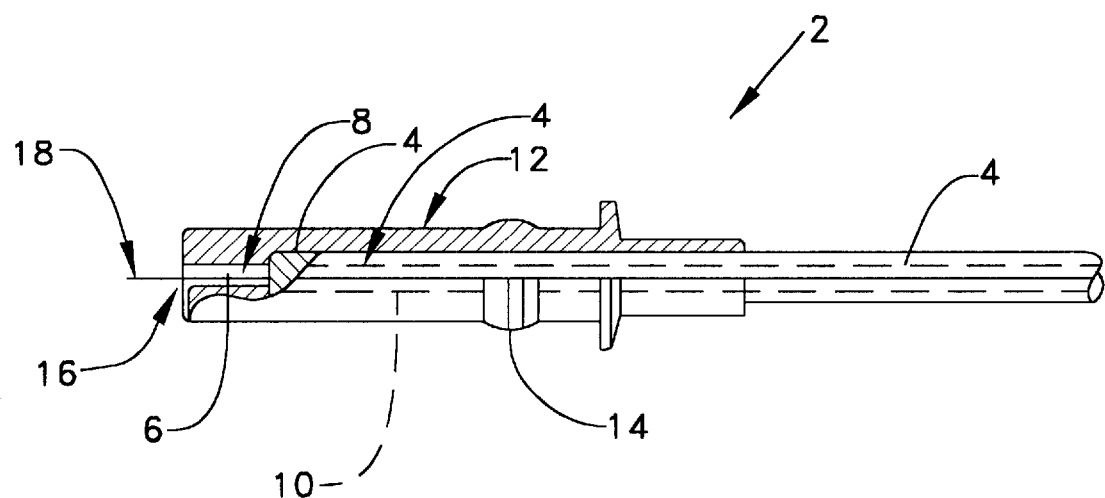

Fig_2_
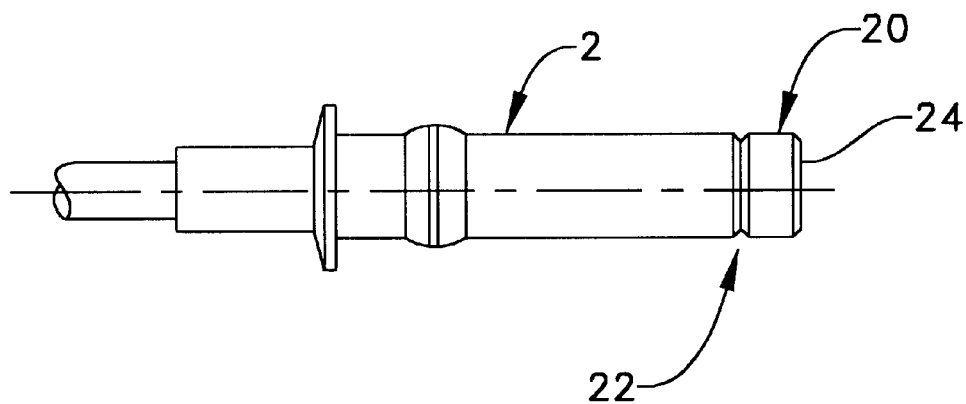
Fig_3_
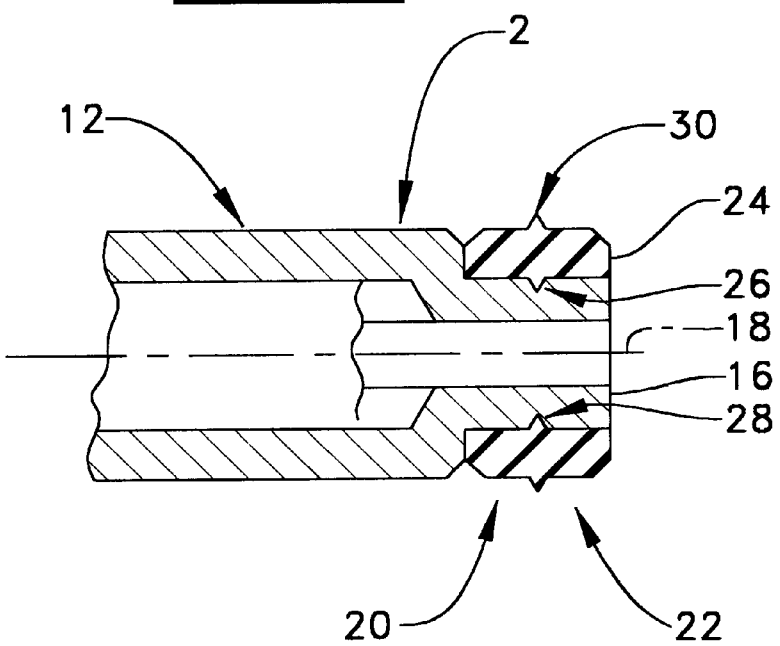

PLASTIC OPTICAL FIBER CONNECTOR

This is a continuation-in-part of U.S. patent application Ser. No. 09/677,186, "A Plastic Optical Fiber Connector" filed by Paul M. Mulligan and Carl W. Lindenmeyer on Dec. 20, 2000, now abandoned.

TECHNICAL FIELD

The subject invention relates to a plastic optical fiber connector having a ferrule in intimate forcible contact with and about said plastic optical fiber. More particularly, the subject invention relates to a plastic optical fiber connector having specific dimensions and a terminal end portion of specific orientation.

BACKGROUND ART

There is a great deal of art in the field of connectors for optical fiber. However, problems still persist with the forming of these connectors or with malfunctions of the connector.

Early attempts to form a optical fiber connector were by connecting a ferrule to the optical fiber by adhesive. Such bonding often did not withstand the environment in which they were being used or failed for other reasons such as, for example, excessive assembly curing time, which represents a waste of time, labor and equipment.

Finishing of plastic optical fiber mounted in a connector has also been by hot plate or abrasive polishing. These methods have difficulty maintaining a flat surface. The quality of finish is dependent on operator skill and therefore is difficult to control. Most diamond machining of a flat surface is accomplished by fly cutting which produced chips and undesirable anomalies.

Other problems with heretofore connectors of this type resulted from improper butting of adjacent fibers to one another. This problem was caused by improper forming of the terminal end.

These heretofore utilized methods also required an undesirable expenditure of labor and required an undesirable level of skill.

It has been discovered that improvement in attaching the ferrule to the plastic optical fiber and developing a terminal end that is planar and oriented 90 degrees relative to the axis of the ferrule and plastic optical fiber is most important in constructing a reliable connector.

The present invention is directed to overcome one or more of the heretofore problems, as set forth above.

DISCLOSURE OF THE INVENTION

In one aspect of the invention, a connecter is provided which has a jacket, a plastic optical fiber and a ferrule. The plastic optical fiber has first and second end portions and is positioned within the jacket with said first end portion being free of said jacket. The ferrule has a stop. The ferrule is positioned about the first and second end portions with said ferrule in intimate forcible contact with and about said plastic optical fiber first end portion. The intimate contact extends over an axially measured length of said ferrule in a range of about 1 to about 3 times the diameter of the plastic optical fiber. The terminal end of said ferrule and associated plastic optical fiber first end portion is free of adhesive and is machined to a planar surface oriented 90 degrees relative to a longitudinal axis of the ferrule and plastic optical fiber first end portion.

BRIEF DESCRIPTION OF THE DRAWINGS

FIG. 1 is a diagrammatic side view in partial section of the connector of this invention;

FIG. 2 is a diagrammatic side view of another embodiment of the connector of this invention which has a sealing ring; and FIG. 3 is a diagrammatic side view in partial section of the embodiment of FIG. 2.

BEST MODE FOR CARRYING OUT THE INVENTION

Referring to FIG. 1, the connector 2 of this invention is an assembly having a jacket 4 extending about a plastic optical fiber 6. The organic plastic optical fiber 6 has first and second end portions 8,10. The first end portion 8 of the plastic optical fiber 6 is free of the jacket 4.

A ferrule 12 has a stop 14 and is position about the first and second end portions 8,10 of the plastic optical fiber 6. The ferrule 12 is in intimate forcible contact with and about said plastic optical fiber first end portion 8 over a an axially measured length of said ferrule 12 in a range of about 1 to about 3 times the diameter of said plastic optical fiber 6.

It has been discovered that intimate forcible contact less than about 1 times the diameter of the plastic optical fiber 6 is undesirable because the angular orientation of the fiber is not well defined and excessive compressive force must be applied to the fiber to adequately clamp it.

Intimate forcible contact over a length greater than 3 times the diameter of the plastic optical fiber 6 is not needed for retention and represents a waste of material, power, and equipment. Preferably, the intimate contact is over an axial length of about 2 times the diameter of the plastic optical fiber 6.

The terminal end of the ferrule 12 and associated plastic optical fiber first end portion 8 are free of adhesive and are maintained together by deformation of the ferrule into intimate forcible contact with the plastic optical fiber first end portion 8.

The terminal end 16 of the ferrule 12 and plastic optical fiber 6 are machined to a planar surface oriented 90 degrees relative to a longitudinal axis 18 of the ferrule 12 and plastic optical fiber first end portion 8. Further, said terminal end 16 is a controlled preselected distance from said ferrule stop 14.

The ferrule 12 is formed of metal, preferably aluminum and more preferably #2011-T3 aluminum. It should be understood however that the ferrule can be formed of other material, such as organic plastic, without departing from this invention.

Referring to FIG. 2, a preferred embodiment of the invention has a sealing ring 20 extending about a first end portion 22 of the ferrule 12. In this embodiment, the terminal end 24 of the sealing ring 20 is preferably in the same plane as the terminal end 16 of the ferrule 12 and the plastic optical fiber 6 and is likewise oriented ninety degrees relative to the axis 18. The terminal end 24 of the sealing ring 20 can be spaced from the terminal end 16 of the ferrule 12 without departing from this invention.

The sealing ring 20 is formed of a thermoplastic elastomer, as is well known in the art.

Referring to FIG. 3, the first end portion 22 of the ferrule 12 has an annular groove 26 formed thereabout for receiving an annular protrusion 28 extending about the bore of the sealing ring 20. Preferably the annular ferrule groove 26 and annular protrusion 28 each have an angle of about sixty degrees and are mateable one with the other in the installed position of the sealing ring 20 on the first end portion 22 of the ferrule 12.

The outer surface of the sealing ring 20 has an annular fin 30 extending thereabout. In the preferred embodiment the annular protrusion 28 and the annular fin 30 are diametrically opposed to one another for adding strength of sealing of the apparatus. It has also been found that a chamfer 32 on the sealing ring extends the life of the sealing ring and aids insertion of the connector 2. Although the locking rove is shown of angular proportion, it can be of other configuration without departing from this invention.

Industrial Applicability

By the careful control of precise length of the terminal end 16 from the stop and the 90 degrees orientation of the terminal end 16 by machining, the connector is uniquely adapted to make precise abutting contact with associated plastic optical fiber.

Added benefits of more precise centering of the connector in the installed position and the prevention of foreign materials from entry into the connection are provided by the sealing ring 20 of this invention. By use of the sealing ring, the waste of time and labor for forming the connector are reduced because tolerance fit need not be so closely controlled.

Other aspects, objects, and advantages of this invention can be obtained from a study of the drawings, the disclosure, and the appended claims.

What is claimed is:

1. A connector, comprising:

a jacket;

a plastic optical fiber having first and second end portions and being positioned within the jacket with said first end portion being free of said jacket; and a ferrule having a stop and being positioned about the first and second end portions with said ferrule in intimate forcible contact with and about said plastic optical fiber first end portion over an axially measured length of said ferrule in a range of about 1 to about 3 times the diameter of said plastic optical fiber and defining a connector, the terminal end of said ferrule and associated plastic optical fiber first end portion being free of adhesive and machined to a planar surface oriented 90 degrees relative to a longitudinal axis of said ferrule and plastic optical fiber first end portion, said ferrule stop being a controlled preselected distance from said machined terminal end.

2. A connector, as set forth in claim 1, wherein the ferrule is formed of metal.

3. A connector, as set forth in claim 1, wherein the ferrule is formed of aluminum.

4. A connector, as set forth in claim 1, wherein the ferrule is formed of #2011-T3 aluminum.

5. A connector, as set forth in claim 1, wherein the ferrule is in intimate forcible contact with said plastic optical fiber over an axially measured length of about 2 times the diameter of said plastic optical fiber.

6. A connector, as set forth in claim 1, wherein the ferrule has an annular groove extending about a first end portion, thereof and including an annular elastomeric ring, said ring having an annular protrusion extending into a bore of the ring and being mateable with said annular groove in the installed position and an annular fin extending outwardly from an outer surface of said ring.

7. A connector, as set forth in claim 6, wherein sides of the annular groove, the annular protrusion and the annular fin each define an angle of about 60 degrees.

8. A connector, as set forth in claim 6, wherein the terminal end of the sealing ring is in the same plane as the terminal end 16 of the ferrule.

9. A connector, as set forth in claim 6, wherein the sealing ring is an elastomer.

* * * * *